United States Patent [19]

Lohberg

[11] 4,119,063

[45] Oct. 10, 1978

[54] FEED SYSTEM FOR INTERNAL COMBUSTION ENGINES TO WHICH A FUEL-AIR MIXTURE AND WATER VAPOR ARE SUPPLIED

[76] Inventor: Werner Lohberg, 15, Elsener Strasse, 4790 Paderborn, Fed. Rep. of Germany

[21] Appl. No.: 764,597

[22] Filed: Feb. 1, 1977

[30] Foreign Application Priority Data

Mar. 2, 1976 [DE] Fed. Rep. of Germany ....... 2604050

[51] Int. Cl.² ............................................. F02D 19/00
[52] U.S. Cl. ................................ 123/25 B; 123/25 L; 123/25 P
[58] Field of Search ................. 123/25 R, 25 B, 25 D, 123/25 P, 25 L

[56] References Cited

U.S. PATENT DOCUMENTS

| 1,539,560 | 5/1925 | Harmon | 123/25 L |
| 2,674,235 | 4/1954 | Drydyke | 123/25 B |
| 2,811,146 | 10/1957 | Spillmann | 123/25 B |
| 3,845,745 | 11/1974 | Dunlap et al. | 123/25 L |
| 3,996,902 | 12/1976 | Ri et al. | 123/25 L X |

FOREIGN PATENT DOCUMENTS

| 142,977 | 1949 | Australia | 123/25 L |

*Primary Examiner*—Ira S. Lazarus
*Attorney, Agent, or Firm*—Krass & Young

[57] ABSTRACT

Feed system for internal combustion engines to which is fed a fuel-air mixture and water vapor generated by a heat exchanger acted on by the exhaust gases, wherein there is a water chamber arranged before the heat exchanger in the water feed line, characterized in that the inlet and the outlet of the water chamber arranged directly before the heat exchanger are provided with valves which are to open automatically in an intrinsically known manner through the intake reduced pressure of the internal combustion engine and that the opening of the outlet valve is larger and/or longer in time than the opening of the inlet valve.

3 Claims, 2 Drawing Figures

FEED SYSTEM FOR INTERNAL COMBUSTION ENGINES TO WHICH A FUEL-AIR MIXTURE AND WATER VAPOR ARE SUPPLIED

INTRODUCTION

The principle is already known of feeding water vapor to the combustion chamber of an internal combustion engine in addition to a fuel-air mixture, in order thereby to raise the power output and/or achieve a more economical fuel consumption, combined with a reduction in air-polluting components in the exhaust gases. For generating the water vapor herein, the heat of the exhaust gases can be utilized.

A fundamental problem in systems of this type consists in an exact proportioning of the amount of water vapor to be supplied to the internal combustion engine depending on its operating condition at the particular time. The water vapor can for example be introduced into the fuel line of the internal combustion engine behind the carburetor or the injection pump and the reduced pressure occurring in the intake stroke of the piston can be used for transporting it. This principle has the advantage that to some degree it allows an automatic proportioning of the particular amount of water vapor added (at any particular time), since the reduced pressure determines the amount of water vapor taken in by it.

In internal combustion engines which are used for propulsion in vehicles, a frequent change in the operating state takes place because of the changing load. It is known that in regard to these special operating conditions a relatively high consumption is indispensable for controlling the feed of this kind of internal combustion engines, in order to assure the feeding of an optimum fuel-air mixture for each possible operating condition.

If additional water vapor is now introduced into the feed of the internal combustion engine, then it becomes immediately apparent that correspondingly high requirements must be imposed on the proportioning of the water vapor in order to avoid operating troubles. Since mechanical porportioning elements, valves in particular, must be fabricated from expensive materials and with high precision in view of the high temperature of the water vapor which is of the order of 400° to 500° C., and since on the other hand controlling a vapor is moreover more difficult than controlling a liquid, the proportioning is suitably done by mechanical regulating elements which are arranged in the water supply line.

It has been found, however, that this method also does not lead to the desired preciseness of water vapor feed, since the water supply line is connected to a heat exchanger and is heated by the latter to a relatively high temperature. Besides this, a reverse heat flow occurs within the water fed into the heat exchanger, which, depending on the operating condition of the internal combustion engine and its related feed rate of the water, leads to fairly high temperatures on the regulating elements and impairs their operation despite their arrangement in the water line. This is the reason why water vapor feed into internal combustion engines has not found extensive use up to now.

It is the objective of the invention to improve these conditions in such a way that with a relatively low expense an exact proportioning of water vapor which is not impaired by the heating is insured in feeding the water vapor into internal combustion engines.

For a feed system for internal combustion engines into which a fuel-air mixture and water vapor generated by a heat exchanger acted on by exhaust gases are to be fed, this problem is solved according to the invention by having a water chamber arranged directly before the heat exchanger in the water feed line, the inlet and outlet of which chamber are provided with valves which are open automatically by means of the intake reduced pressure of the internal combustion engine, and by dimensioning the opening of the outlet valve to be larger and/or longer in time than the opening of the inlet valve.

By the invention a reliably operating heat barrier is created, for it can be determined that when it is inserted before the heat exchanger, the line connected with the water reservoir remains quite cold, so that the required regulating elements can be provided in this line without any fear of their being impaired by too high temperatures. Additionally, the advantage of lower heat losses is achieved thereby, so that the heat gained causes an increase in the temperature of the water vapor generated in the heat exchanger and thereby a further improvement in the efficiency of the internal combustion engine. The invention therewith makes possible an application of the principle of feeding of water vapor into internal combustion engines in such a way that now its widespread adoption at a relatively low cost is conceivable also, especially in motor vehicles.

A practical example of the invention is described in the following on the basis of the figures. They show:

DETAILED DESCRIPTION OF THE ILLUSTRATIVE EMBODIMENT

Figure 1:
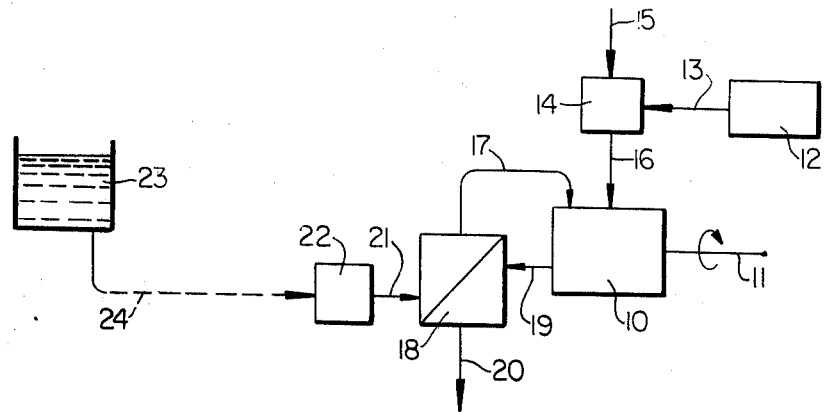
FIG. 1 shows a diagrammatic representation of a feed system for an internal combustion engine to which water vapor, as well as a fuel-air mixture, was fed.

In FIG. 1 is represented an internal combustion engine 10 which produces a torque on its drive shaft 11 and thus can be used for driving a motor vehicle for example. This internal combustion engine 10 is fed with fuel from a reservoir 12, which fuel is fed by way of a line 13 to a carburetor or a primer 14. Moreover, air is fed through a line 15 to the carburetor 14, which air is mixed in the carburetor 14 with the fuel, so that the fuel-air mixture can be fed through a line 16 to the combustion chambers of the internal combustion engine 10. A further feed line 17 is provided through which water vapor is fed to the internal combustion engine 10. This water vapor is generated in heating means comprised of a heat exchanger 18 which is driven by the exhaust gases of the internal combustion engine 10 to heat the water vapor prior to being fed into the internal combustion engine 10. These exhaust gases are fed to the heat exchanger 18 through an exhaust pipe 19 and leave it through another exhaust pipe 20. Moreover, water vapor from a water chamber 22 is fed to the heat exchanger 18 through an inlet line 21. The water from a water reservoir 23 is fed to this water chamber 22 through a line 24 which is partly represented as a broken line to signify that in this line 24 can be inserted regulating elements with which a proportioning of the amount of water fed to the heat exchanger is possible.

The water chamber 22 shown in FIG. 1 is arranged directly before the heat exchanger 18 and prevents any reverse flow of the heat transferred to the water in the heat exchanger 18 into the line 24 or to the water reservoir 23. In this way operating troubles of the regulating elements arranged in the broken-line part of the line 24 are avoided, because the line 24 behind the water chamber 22 remains practically at ambient temperature, since the water chamber 22 acts as a heat barrier. In this way more heat is accordingly available in the heat exchanger 18 for vaporizing the water fed to it, so that the steam fed to the internal combustion engine 10 is under higher pressure and brings about a further power increase in the internal combustion engine 10.

Figure 2:
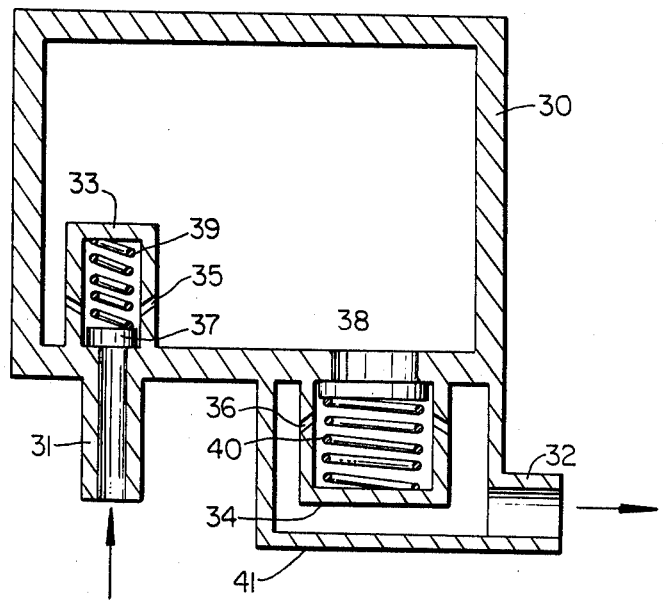
FIG. 2 shows the cross section of a water chamber used in the system according to FIG. 1 and formed according to the invention.

FIG. 2 shows the cross section of the water chamber formed according to the invention. It consists essentially of a case 30 which for example can be designed in circular form and has the rectangular cross section represented. This case 30 has two connections 31 and 32; the connection 31 serves for connecting with a feed line, the connection 32 serves for connection with a discharge line. The connection 31 is assigned to the inlet valve means which is formed by a valve arrangement 33. The connection 32 is assigned to the outlet valve means which is formed by a valve arrangement 34.

Both valve arrangements 33 and 34 consist essentially of a valve case with lateral flow-through ducts 35 or 36. In each valve case is arranged a valve head 37 or 38 which rests against a valve seat formed by an edge of the case and is pressure responsive by being pressed against the valve seat by a pressure spring 39 or 40 supported on each valve case. The outlet valve arrangement 34 is surrounded by an additional case 41 in which the water flowing in through the flow-through duct 36 enters when the valve opens and from which it can then be carried off through the connection 32.

The connection 32 is connected through the line 21 shown in FIG. 1 with the heat exchanger 18, while the connection 31 is connected with the line 24 or with regulating elements which affect a proportioning of the water fed in. When a reduced pressure is produced in the feed line system during the intake stroke of the internal combustion engine 10 (FIG. 1), then this reduced pressure within the system represented in FIG. 1 acts on the outlet valve arrangement 34 by way of the heat exchanger 18 and the line 21, whereby the valve head 38 is lifted off of its valve seat at a predetermined pressure in the discharge line and the water present in the case on the valve head 38 can reach the additional case 41 by way of the flow-through ducts 36 and can be fed to the heat exchanger 18 by way of the connection 32 or the line 21 (FIG. 1). Moreover, the reduced pressure here also acts on the inlet valve arrangement 33 inside the case 30, in such a way that its valve head 37 is lifted off its valve seat and new water can be introduced into the case 30 at a predetermined pressure below said predetermined pressure opening the outlet valve.

During the continuous operation of the internal combustion engine, events of the kind described above occur periodically, so that the two valve arrangements 33 and 34 operate in the manner of oscillating valves. It is seen from FIG. 2 that the valve head 38 of the outlet valve arrangement 34 has a larger diameter than the valve head 37 of the inlet valve arrangement 33. This dimensioning is provided according to the invention in order to achieve the desired function of the water chamber 22 as a heat barrier. Additionally, the valve springs 39 and 40 can also be different in strength in order to reinforce the effect of openings of different sizes by means of these. Thus, for example, the valve spring 40 can be weaker than the valve spring 39, so that for a given reduced pressure different opening periods occur in the two valve arrangements 33 and 34 and the valve arrangement 34 is opened longer than the valve arrangement 33. The two valve arrangements 33 and 34 can also show valve heads 37 and 38 of the same size, whereby it is then solely the different strengths of the valve springs 39 and 40 which bring about the longer opening in time of the valve arrangement 34.

The function of the water chamber 22 as a heat barrier arises from the fact that the different dimensions of the inlet opening and of the outlet opening of the case 30 in continuous operation of the internal combustion engine 10 bring about a reduced pressure in the case 30 which allows the water fed into the case 30 to vaporize at least partially at a comparatively low temperature. This brings about a temperature drop or a cooling effect on the case 30, which prevents the heat from being transferred to the line 24 by way of the connection 31 (FIG. 1).

The practical example of a water chamber shown in FIG. 2 can also be embodied differently; for example, the inlet and the outlet valve means can also be provided on walls opposite one another. The arrangement in a common lower wall has proven advantageous however; a very good cooling effect was achieved hereby. This is attributed to the fact that the water vapor formed in the case 30 comes into contact with a very large case surface in the horizontal arrangement represented in FIG. 2 through the water level existing in the case 30.

The dimensioning of the two valve arrangements as regards their difference in size and/or the force of their valve springs depends on the particular construction and power (or performance) data of the internal combustion engine to which it is assigned. It must be considered, further, that the mode of operation described of the valve arrangements in the manner of oscillating valves which are actuated by the intake reduced pressure of the internal combustion engine leads to an automatic control of the water vapor proportioning (or dosing) independently of any operating condition of the internal combustion engine. The requirement imposed at the outset for the most economic operation possible of the internal combustion engine is fulfilled when the highest possible power which can be achieved with the fuel supplied is delivered under conditions of high load, for example in accelerating, and when the fuel consumption is reduced by an additional utilization of the effect of injected water vapor under conditions of low load, for example on the cruising condition. In order that the two valve arrangements will be actuated by the intake reduced pressure of the internal combustion engine, this requirement is automatically fulfilled by a suitable dimensioning of the valve arrangements, since in the acceleration state a low reduced pressure prevails on the fuel line system as a result of a large amount of fuel taken in, so that only a little water vapor is introduced into the internal combustion engine. The valve arrangements can be dimensioned in such a way that under this condition no water vapor at all is introduced. In cruising operation, however, where there is a comparatively small amount of fuel taken in, a lower pressure prevails in the fuel line system, so that then more water vapor is taken in and acts to increase the power.

This causes the fuel consumption to be reduced in an operating condition in which the maximum power attainable with the fuel need not be produced anyhow.

The embodiments of the invention in which an exclusive property or privilege is claimed are defined as follows:

1. A water vapor feed system for feeding heated water vapor into the combustion chamber of an internal combustion engine comprising:

reservoir means containing a supply of liquid water;

a case having a water chamber formed therein;

means for directing liquid water from said reservoir means into said water chamber, said means including a feed line connected to said reservoir means and inlet valve means controllably establishing a fluid connection between said feed line and said water chamber;

means for feeding water from said water chamber into said internal combustion engine, said means including a discharge line and means further including outlet valve means controllably establishing fluid communication between said water chamber and said discharge line;

said outlet valve means including pressure responsive means responsive to a drop in pressure in said discharge line to a predetermined pressure to establish communication of said discharge line with said water chamber;

heating means for heating water received in said discharge line prior to being fed into said interior combustion engine;

said inlet valve means including pressure responsive means to establish communication of said water chamber with said feed line upon a drop in pressure in said water chamber to a predetermined pressure;

said predetermined case pressure being lower than said predetermined discharge line pressure, whereby said liquid water upon entering said water chamber is reduced in pressure to cause said liquid water to be at least partially vaporized to thereby cool said case and provide a heat barrier from said heating means during operation of said internal combustion engine.

2. The system according to claim 1 wherein said inlet valve means and outlet valve means includes valve heads of equal diameter covering inlet and outlet valve openings in said case, with said outlet valve head being larger than said inlet valve head, and both inlet valve means and outlet valve means including springs of equal strength pressing said valve heads against said respective inlet and outlet valve openings, whereby said outlet valve means opens at a lower predetermined pressure than said inlet valve means.

3. The system according to claim 1 wherein said case is disposed horizontally and wherein said inlet valve means and said outlet valve means are located in a lower common horizontal wall of said case, whereby said water vapor cools the upper walls of said case above any liquid water in said chamber.

* * * * *